Nov. 5, 1957 G. R. PAINE 2,811,789
ELEVATION SCANNING RADAR SIMULATOR
Filed Nov. 13, 1952 5 Sheets-Sheet 1

INVENTOR.
GEORGE R. PAINE
BY
ATTORNEY

Nov. 5, 1957 G. R. PAINE 2,811,789
ELEVATION SCANNING RADAR SIMULATOR
Filed Nov. 13, 1952 5 Sheets-Sheet 2

INVENTOR.
GEORGE R. PAINE
BY
*H. S. Mackey*
ATTORNEY

Nov. 5, 1957  G. R. PAINE  2,811,789
ELEVATION SCANNING RADAR SIMULATOR
Filed Nov. 13, 1952  5 Sheets-Sheet 3

Fig. 4

INVENTOR.
GEORGE R. PAINE
BY
H. A. Mackey
ATTORNEY

United States Patent Office 2,811,789
Patented Nov. 5, 1957

2,811,789

ELEVATION SCANNING RADAR SIMULATOR

George R. Paine, Pleasantville, N. Y., assignor to General Precision Laboratory Incorporated, a corporation of New York Application November 13, 1952, Serial No. 320,316

6 Claims. (Cl. 35—10.4)

This invention relates to instruments for simulating radar operation in connection with a plurality of targets. The invention more specifically relates to simulators in which target positions and movements in the three directions of space are simulated and in which luminous indications of these positions are exhibited on radar type displays to simulate representations of radar echoes.

In training operators of radar equipment it becomes expedient, because radar equipment is large and cumbersome, to employ simulating instruments which are much smaller and cheaper than radar equipment. Also in place of employing fleets of aircraft to serve as radar targets it is far simpler, more economical and more convenient to generate target signals electronically at the training instrument and to introduce them electrically to the simulator. This eliminates any requirement for a radar instrument and eliminates the transmission of radar energy and possible interference with other services. Likewise in generating target signals locally, the courses and speeds of a number of simulated radar target aircraft are continuously under control of the training instructor, which is advantageous.

One general type of radar scanning equipment, namely, an elevation scanning height-finding radar radiates a single beam of pulsed microwave energy which is made to scan or oscillate rapidly in the vertical or elevation direction while at the same time rotating or scanning more slowly in the horizontal of azimuth direction. Many variations of this general type of radar exist, and the present invention is applicable to the simulation of any of them.

Such a height-finding radar presents its formation on a cathode ray tube screen on which horizontal distances represent target slant range and vertical distances represent target height so that by the aid of movable luminous electronic indices the position of any luminous mark or "pip" can be read directly to indicate the height above ground of the aircraft target which it represents.

The radar simulator of this invention in general includes one or more signal generators each of which generates electrical signals representing the position of an aircraft target in space. Provision is made for setting in the position of each target in terms of orthogonal north-south, east-west, and height coordinates. The simulator also includes an antenna signal generator having an electrical signal output representing the azimuth component of the antenna motion. Another generator is provided for producing an electrical signal representing the vertical component of the antenna motion. A cathode ray tube having a long persistence luminous screen is provided as indicator of the output signals of the radar simulator, and is similar to or identical with the display tube of the actual radar set. It is calibrated and marked in slant range and height in exact simulation of the radar display tube.

The signal generator of the radar simulator may, in addition to containing provision for setting target positions, also contain provision for setting target course and speed, thus enabling use of the simulator in moving target problems. However, as the techniques for such controls are well known in the art, and as their use is not pertinent to the present invention, they are omitted, and only the three-dimensional positioning of each target is accomplished in the target generator here employed.

In the operation of the radar simulator, the target and antenna signals are applied to coincidence circuits in such manner as to produce intensification of the cathode ray of the display tubes at coincidence times, producing transitory luminous spots or "pips" on the screen at corresponding positions, from which target heights can be read directly on the electronic index scale.

The object, then, of this invention is to simulate the operation of an elevation scanning height-finding radar instrument, the simulator employing one or more sets of preset simulated target signals, each set of signals representing the position in space of a target including its height, and employing a display representing the positions of the simulated targets including their heights.

A further understanding of this invention may be secured from the following detailed description and associated drawings, in which.

Figure 1:
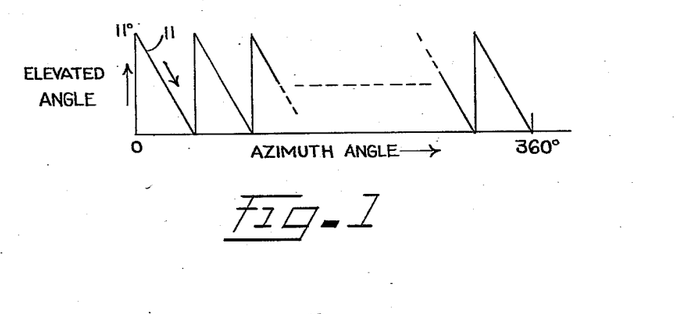
Figure 1 schematically illustrates the motion of the beam of an elevation scanning height-finding radar.
Figure 2:
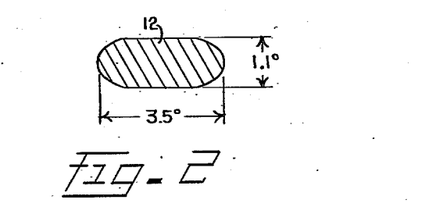
Figure 2 is a cross sectional representation of the beam.

In order to facilitate an understanding of the radar simulator, it is desirable to describe briefly the operation of one representative type of elevation scanning height-finding radar. This particular radar instrument scans vertically at the rate of ten radar beam scans per second through an elevation angle of 11 degrees, scanning upward rapidly and downward slowly, the downward scan taking .09 second. At the same time the radar beam rotates continuously and steadily in azimuth in a clockwise direction, viewed in plan, at a rate of one revolution in 15 seconds. The developed scanning pattern is represented in Fig. 1, there being 150 vertical scans 11 during one complete azimuth rotation of the beam. The cross section of the beam is shown in Fig. 2 at 12, and has a cross section of 1.1° vertically and 3.5° horizontally. The radar instrument employs pulsed microwave energy, the pulse rate ordinarily being 1170 P. P. S.

In the simulation of the operation of such a height-finding radar instrument, an electrical signal is generated to simulate the radar input data of each target "seen" by the radar. The number of targets "seen" by the actual radar simultaneously or consecutively as it scans can be indefinitely large, and likewise in the simulator, by adding target signal generating equipments, any number of targets can be simulated. However, since the operation of the simulator on a single target signal is representative, description will be confined to such operation.

The target input data to the radar simulator are, of course, different from those applied to the actual radar instrument, and consist of target position in the ground plane in the form of two voltages representing the rectangular coordinates of that position, and target height in the form of a representative voltage. The simulator input data also include two antenna voltages, one representing the horizontal antenna scanning motion and the other the vertical antenna scanning motion. From these target and antenna data the simulator computes an exact solution and presents it in the form of output data to the display tube. The quantities solved for are exactly the same as in the radar instrument, and consist of slant range, azimuth and elevation angles of the target, and azimuth and elevation angles of the antenna. A video signal representing the target is generated in the simulator and is displayed under appropriate limitations so that the video signal appears only when the simulated antenna is correctly oriented in both azimuth and elevation.

Figure 3:
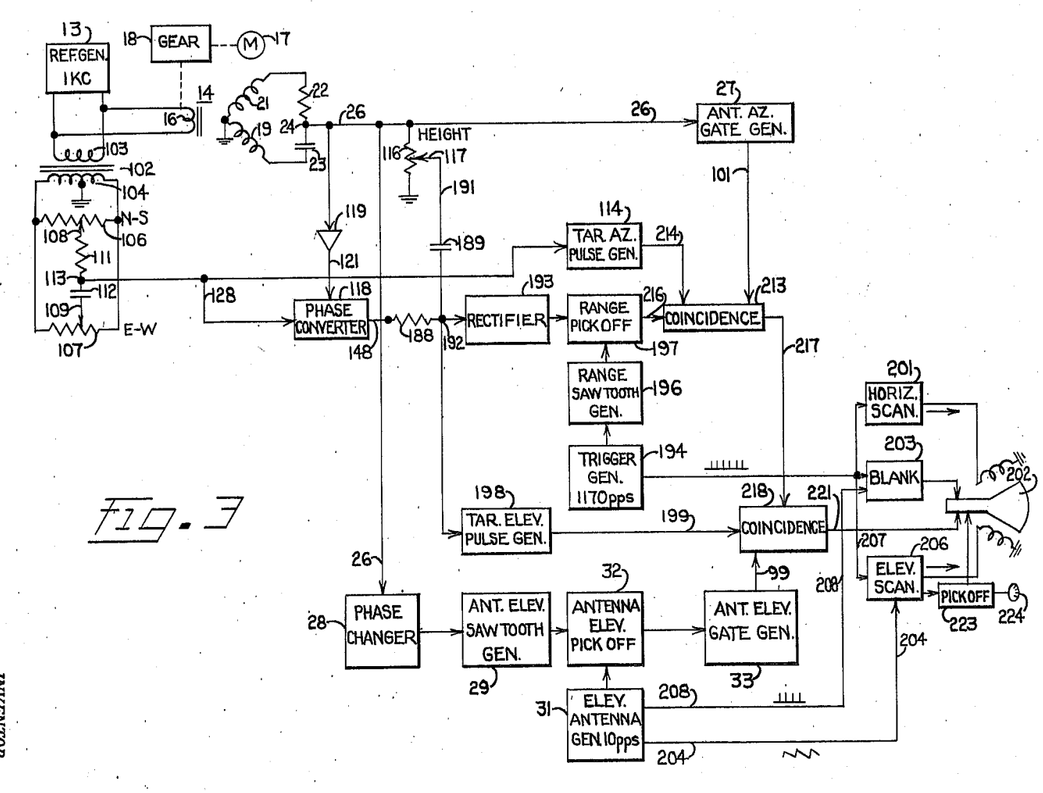
Figure 3 is a schematic diagram of the elevation scanning radar simulator of this invention.

The instrumentation of the radar simulator is shown in Fig. 3. A generator 13 produces a sinusoidal alternating voltage output having a frequency of, say, 1000 cycles per second. This output is used both as a source of energy for all signals and as the reference standard of voltage, frequency and particularly of phase. The generator output is applied to a synchro resolver 14 having the function of generating an output signal that simulates, by slowly changing phase, the azimuth rotational motion of an elevation scanning radar antenna. The 1000 C. P. S. supply 13 is connected to the primary winding 16 which is rotated at the rate of 4 revolutions per minute by a motor 17 operating through a reduction gear 18. 1000 C. P. S. energy is generated in the secondary windings 19 and 21 which are arranged spatially at right angles, so that the output voltages vary in magnitude in quadrature at the 4 R. P. M. rate. A polar conversion circuit consisting of a resistor 22 and condenser 23 of like impedance in series is connected between the windings 19 and 21. The 1000 C. P. S. voltage secured from the common junction 24 is then constant in magnitude but has a phase that varies relative to the phase of source 13 at the rate of rotation of the primary winding of four cycles per minute. The phase change has a sense depending on the connections to the synchro and its direction of rotation, a phase retardation being preferred for illustration. The exact output frequency is then that of the source 13 minus the rotational speed of the synchro, or 999$\frac{14}{15}$ cycles per second.

Figure 4:
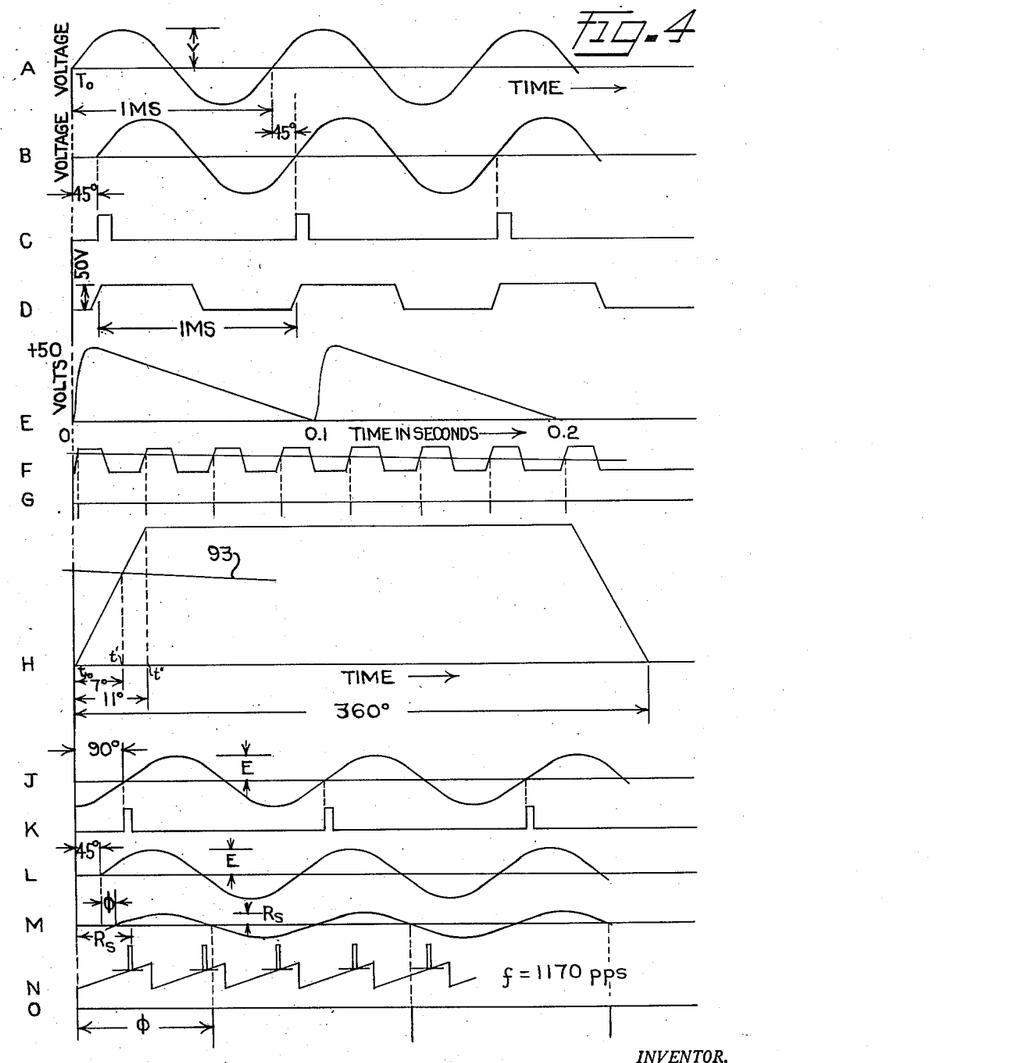
Figure 4 depicts waveforms found in the circuit of the invention.

The phase relations are graphically shown in Fig. 4, in which the wave form A represents the reference voltage of 13, having a reference peak voltage V and a phase that crosses the time axis at time $t_0$. Wave form B represents the phase of the antenna azimuth simulator voltage at junction 24, and is drawn when its voltage phase has a retardation of 45° relative to the reference voltage. This retardation, however, continuously increases, and the wave form B can be imagined as continuously drifting bodily to the right in the figure relative to wave form A at the rate of one cycle of difference in 15 seconds, while at the same time it has the usual connotations as a representation of a 1 kc. sine wave.

The synchro resolver circuit thus generates at its output terminal 24 a sinusoidal voltage that can be considered as the partial electrical analogue of the motion of a particular type of radar antenna, the varying output phase of which represents, by its instantaneous value relative to the reference phase of generator 13, the instantaneous azimuth angle of the antenna beam.

The azimuth phase analogue voltage is transmitted through conductor 26 to an antenna azimuth gate generator 27 which generates a narrow rectangular pulse beginning at each positive-going axis crossing of the sinusoidal voltage. The width of this pulse represents the width of the antenna beam in terms of the one kc. period and is therefore 3.5° wide, or $\frac{3.5}{360}$ of one cycle of the wave form B, Fig. 4. The pulse width therefore is approximately 10 μs. These pulses occur at the rate of 999$\frac{14}{15}$ per second, and are represented, but not to scale, at C, Fig. 4.

The antenna beam elevation motion is simulated by a sawtooth voltage having the form and frequency of the simulated vertical antenna motion as indicated at 11, Fig. 1. This sawtooth voltage has a frequency of 10 C. P. S., and is made to generate an antenna elevation gate which represents to a selected scale the 11° angular range of vertical scan. In selecting the scale to be employed the approximately one millisecond period of the antenna azimuth analogue voltage is used as representing 360° of vertical rotation of the antenna beam. Since the beam motion is actually over a sector of only 11°, the first 11° of the electrical cycle is made to represent the beam motion. The reference sinusoid is an analogue of the vertical beam motion in its phase only, and not in a time sense, since one beam vertical sweep or single sawtooth scan and return consumes 0.1 second of time, while it takes only about 30 μs. for the reference voltage to progress through 11° of one of its periods. The output of this circuit is a gate pulse series having a relative phase that varies from 11° to zero at the rate of elevation scanning.

Figure 5:
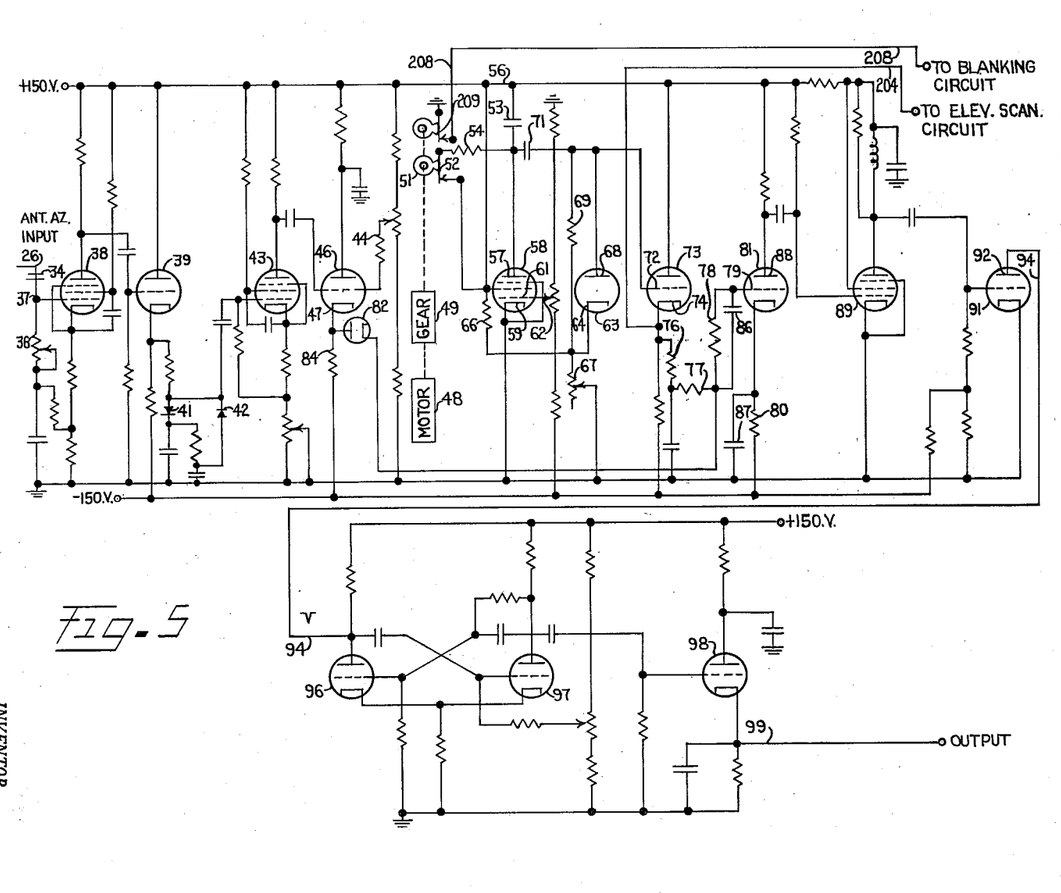
Figure 5 is a schematic diagram of an antenna elevation signal generator circuit utilized in the practice of the invention.

This antenna elevation gate is generated by a group of five components shown in Fig. 3 as the phase changer 28, elevation sawtooth generator 29, elevation antenna generator 31, antenna elevation pickoff 32, and antenna elevation gate generator 33. The function of the phase changer 28 is to advance the phase of the input voltage by approximately 40° to match voltage advance produced elsewhere, principally in the quadrature circuit for generating slant range. The phase changer circuit is shown in Fig. 5 and consists of a condenser 34 and resistor 36 in series. The one kc. reference voltage is not directly employed as input to the phase changer, but it is employed as it comes from the antenna azimuth simulator output terminal 24, having a frequency of one kc. with slowly receding phase, or having an absolute frequency of 999$\frac{14}{15}$ C. P. S. This voltage is applied through conductor 26, Figs. 3 and 5 to the condenser 34, Figure 5. Output is applied from the junction 37 to a pentode amplifier 38 and cathode follower 39. The amplified sinusoidal voltage is applied to a peak limiter comprising two crystal diodes 41 and 42, resulting in a one kc. voltage wave shape having an approximately trapezoidal form as illustrated in Fig. 4 at D. This wave form is inverted and amplified in the pentode 43 and by means of the adjustable grid bias connection 44 of cathode follower 46 the voltage wave form is given a positive bias, so that the peak to peak voltage range at cathode 47 varies between ground or zero potential and +50 volts.

A motor 48 together with a reduction gear 49 rotates a cam 51 at a rate of 10 revolutions per second to open and close a contact 52 at that rate. This contact 52 is connected to short-circuit a condenser 53 through a low resistance 54. The condenser 53 is connected between a source of positive voltage represented by the conductor 56 and the plate 57 of a pentode 58. The pentode 58 has its cathode 59 grounded and its control grid 61 adjustably connected at 62 to a source of negative potential so that the condenser 53 may charge at a constant current rate dependent upon the setting of the slider 62. The voltage at plate 57 then is +150 volts during the time that the condenser is short-circuited, and drops at a uniform rate between short-circuited periods. Thus for a period of approximately .09 second out of each 0.1 second interval the voltage-time relation at plate 57 is represented by a downward-sloping straight line having a slope controlled by the setting of slider 62.

The diode 63 has its cathode 64 connected to the midpoint of a voltage divider consisting of resistors 66 and 67, the latter being adjustable and set to maintain the potential of the cathode at +50 volts. The diode plate 68 is connected to its cathode 64 through a resistor 69, so that during quiescent periods, when the condenser 53 is short-circuited, the plate 68 assumes the same potential of +50 volts. At the end of a short-circuit period the potential on the left element of the coupling condenser 71 is +150 volts and that on the right element is +50 volts. During the ensuing period the potential of the plate 57 falls, carrying the potential of the right element of condenser 71 down with it, and also the control grid 72 of triode cathode follower 73. No current flows through the diode 63 at this time because its plate 68 is less positive than its cathode 64. However, at the time that condenser 53 is again short-circuited, this diode limits to +50 volts the maximum positive voltage to which the control grid 72 can rise.

The cathode 74 of the cathode follower 73 of course closely follows in potential that of its grid 72. The cathode 74 is connected through resistors 76, 77, and 78 to the grid 79 of a triode amplifier 81. The grid 79 therefore follows the sawtooth rise and fall of voltage of the plate 57 of pentode 58, except that its limits are zero and +50 volts. This sawtooth voltage change is shown in Fig. 4 at E, the time scale being different from that of graph D, about 90 cycles of the trapezoidal form of graph D occurring during each cycle of graph E.

The trapezoidal voltage of the cathode 47 of triode 46 is aplied through a diode 82 to the junction 83 of resistors 77 and 78, the diode 82 being poled to pass current only when the potential of the cathode 47 is higher than that of the junction 83. Let it be supposed, for example, that the potential of the junction 83 as controlled by the cathode 74 of triode 73 is momentarily at +25 volts. The trapezoidal voltage of cathode 47 of triode 46, as it rises from zero, so long as it is less than +25 volts, does not cause current flow through diode 82 which therefore has substantially infinite resistance. When the trapezoidal voltage reaches +25 volts, however, the diode 82 becomes conductive, and a relatively large current flows through it because the resistance of the cathode return of triode 46 is no longer that of the resistor 84, but is quite low for pulse or high frequency inputs. This cathode return consists of the diode 82, condenser 86, triode 81, and condenser 87. This results in a relatively heavy grid current surge in triode 81 and an inverted voltage output at plate 88 in which the high frequencies generated at the instant of conduction of diode 82 are greatly emphasized. These high frequencies are further emphasized in the damped resonant plate circuit of the following pentode amplifier 89 so that the output of the following triode trigger 91 at its plate 92 is a sharp negative pulse. The function of this pulse is to indicate the times at which the rising trapezoidal voltages of cathode 47 become equal to the slowly descending bias voltage applied by cathode 74 to control grid 79. It will be noted that since this bias voltage is slowly decreasing, succeeding pulses will recur earlier each time. This is indicated to an exaggerated scale in graph F, Fig. 4, the resulting sharp pulses at plate 92 being indicated in graph G.

The manner in which the pulses of graph G represent by their relative phases the vertical motion of the antenna beam is illustrated in graph H, which is an enlargement of one of the cycles of graph F with the corresponding pulse of graph G superimposed on it. In graph H the single trapezoid cycle represents a single complete (hypothetical) vertical revolution of the antenna beam, and the rising part from $t_0$ to $t''$, represents 11° of this revolution, or the magnitude of the actual beam scan. The line 93 representing the potential of cathode 74 cuts the rising trapezoidal line at time $t'$, which for illustration is taken to represent 7°, or an elevation of the antenna beam of 7° above the horizontal. Since in the succeeding trapezoidal cycle the line 93 will cut the rising front at a lower point, an antenna beam elevation of slightly less than 7° will be represented by that cycle.

The negative pulse at plate 92, Fig. 5, is applied through conductor 94 to a monostable multivibrator comprising tubes 96 and 97. Time periods are designed to produce a rectangular output pulse having a time duration of 3.5 $\mu$s. to represent, to the scale employed, the 1.1° vertical thickness of the beam. The multivibrator is followed by a cathode follower 98, at the cathode conductor 99 of which these antenna elevation gate pulses appear.

The motion of an elevation scanning radar antenna beam is thus represented by two analogue voltages. The azimuth motion is represented by the retreating phase of the rectangular pulses shown at C, Fig. 4. Their frequency is 999$14/15$ C. P. S. so that relative to the reference phase their phase moves to the right at the antenna beam azimuth rate of one revolution in 15 seconds. These pulses are impressed on conductor 101, Figure 3. The elevation motion is represented by the advancing phase of the sharp pulses shown at G, Fig. 4. Their average frequency is also 999$14/15$ C. P. S., but during the downward slope times of graph E their phase advances at the rate of $11/360$ cycle in 0.09 second. These pulses are impressed on conductor 99, Fig. 3.

Target position analogue voltages consist as before stated of two voltages representing target position in the ground or horizontal plane and a third voltage representing target height. These analogue voltages are all derived from the one kc. generator 13.

A transformer 102, Figure 3, has a primary winding 103 energized from the generator 13, while the secondary winding 104 has a grounded center tap. Two voltage dividers 106 and 107 are energized in parallel from the winding 104. The voltage divider 106 is utilized for setting the north-south coordinate of position of a single target projected on the ground, and the magnitude and sense of the alternating voltage at its slider 108 relative to ground represents and is the electrical analogue of the position of the simulated target north or south of the location of the simulated radar instrument. Similarly, the voltage at slider 109 of the voltage divider 107 represents the east-west coordinate of the target position projected on the ground plane.

These two voltages analogous to the two rectangular coordinates of ground plane position of the target are combined to form a single voltage which by its magnitude and phase is the analogue in polar coordinates of the same target position. To accomplish this, sliders 108 and 109 are connected to a quadrature circuit consisting of resistor 111 and condenser 112 in series, the resistance of the resistor being numerically equal to the reactance of the condenser at 1000 C. P. S. The output voltage is taken from the junction point 113 of the resistor 111 and condenser 112. This voltage magnitude relative to a function of the reference voltage of generator 13 represents the ground range to the target, and the phase of this voltage relative to the reference phase represents the azimuth angle of the target direction relative to true north at the plotting point or simulated radar position.

This circuit for the generation of electrical voltage analogues of rectangular coordinates and for transformation of them to a single polar analogue voltage is more fully described in Patent No. 2,610,789 of E. B. Hales, issued September 16, 1952.

The output of the quadrature circuit at junction 113 is graphically indicated in graph J, Fig. 4. In this graph the peak voltage E relative to the reference voltage represents and is the analogue of ground range of the target, while the instantaneous phase relative to the reference phase represents and is the analogue of the azimuth of the target relative to true north. For example, the graph J has a peak voltage two-thirds of that of the reference source, indicating to some scale a specific ground range, and the phase is 90° behind that of the reference source, indicating a target azimuth of 90°.

A plurality of such analogue voltages as that existing at junction 113 may be combined by well-known methods to represent at the same time a plurality of targets on the tube screen. In order to do so each target added requires the addition of such target generating and quadrature addition components and of all other components, yet to be described, pertaining to the target up to the cathode ray tube input circuits.

The sinusoidal analogue voltage at 113, representing target ground range and azimuth angle, is employed to generate a sharp pulse representing its phase, the magnitude of the voltage not having significance here. This pulse is generated in a conventional gate circuit 114 each time that the wave form J, Fig. 4, crosses the zero axis in the positive-going direction. This rectangular gate pulse is about 1 μs. in width and is indicated in graph K, Fig. 4. The phase of the pulse front is the same as the positive axis crossing of the wave J and is employed as the analogue of target azimuth.

Target elevation input is generated by a voltage divider 116 which is energized by antenna azimuth polar analogue voltage secured from junction 24. The slider 117 of voltage divider 116 is set to the desired target height. The output is then a sinusoidal voltage having the antenna azimuth phase as shown in graph B, Fig. 4 and a magnitude relative to a function of the generator 13 voltage representing the selected target height.

It is necessary to combine this target height analogue voltage with the target ground range analogue voltage to secure a single voltage representing slant range and elevation angle. This cannot be done by direct combination of the voltages at junctions 113 and 24 because the former has the fixed phase representing target ground azimuth based on the reference phase, and the latter has a continuously changing phase relative to the reference phase and representing the continuously rotating antenna beam. It is therefore necessary to convert the analogue voltage at junction 113 to one having the same magnitude but having the antenna azimuth analogue phase. This is accomplished in a phase converter circuit 118.

Figure 6:
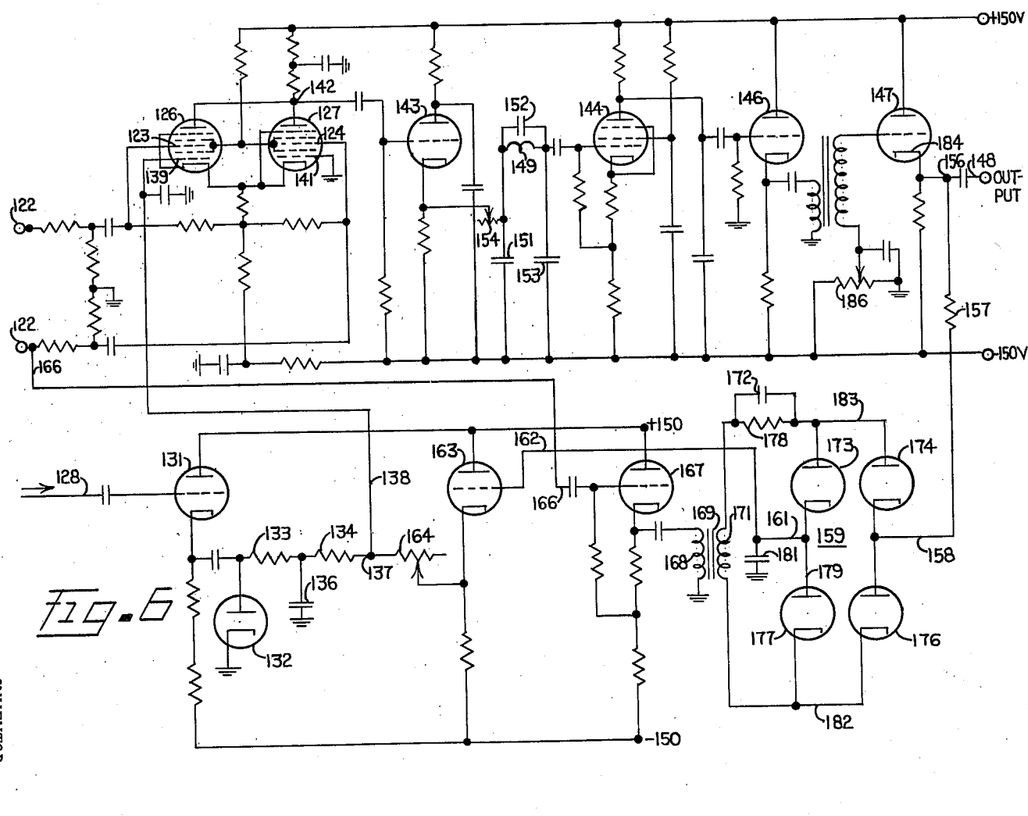
Figure 6 is a schematic diagram of a phase converter circuit used in connection with the invention.

The antenna phase is introduced to phase converter 118 from the junction 24 through an amplifier 119 and a group of conductors 121, through which this input is introduced across two input terminals 122—122', Figure 6, as a sinusoidal voltage having the antenna azimuth phase as shown at B, Figure 4. This voltage signal is applied in push-pull to the third grids 123 and 124 of two pentagrid tubes 126 and 127 comprising a balanced modulator. The ground range input signal is secured from junction 113, Figure 3, and is applied through conductor 128 to the triode cathode follower 131, Fig. 6. This signal has the voltage magnitude E represented in graph J, Figure 4, and is applied through the cathode follower 131 to a rectifier comprising a diode 132, resistors 133 and 134 and condenser 136. The resulting direct-current signal after partial neutralization by negative feedback has a magnitude representing ground range normally between the limits of minus two and zero volts. It is applied from junction 137 through conductor 138 to the first grid 139 of modulator tube 126, the first grid 141 of tube 127 being grounded. The modulator output at the common plate junction 142 has the frequency and phase of the input at 122—122' and a magnitude representative of the magnitude of signal applied to grid 139.

The modulator output is amplified in an alternating current amplifier including tubes 143, 144, 146, and 147 to become the phase converter output at conductor 148. This output is sinusoidal, has the phase of the antenna azimuth analogue voltage and a voltage magnitude representative of the target ground range analogue voltage. It is illustrated by graph L, Fig. 4.

The amplifier contains a filter including inductance 149 and capacitances 151, 152, and 153 to eliminate the second harmonic. To neutralize filter phase shift and to provide means for precise phase adjustment so that the phase at 148 will be exactly that at 122, an adjustable resistor 154 is provided at the filter input and the filter output is arranged to work into a high impedance load.

A large degenerative feedback is employed to secure output linearity. The feedback path extends from the output cathode junction 156 through resistor 157, conductor 158, a phase-sensitive detector 159, conductors 161 and 162, cathode follower 163 and adjustable resistor 164 to the junction 137. At this junction the degenerative feedback is a positive direct-current voltage almost completely opposing the negative potential derived from the rectifier 132, leaving a difference voltage of no more than −2 volts.

The function of the phase-sensitive detector 159 is to prevent noise peaks from momentarily making the modulator grid 139 positive, which would reverse the sense of the modulator output voltage and cause the amplifier to regenerate and become inoperative. Detector 159 is provided with antenna phase potential as a reference from conductor 122' through conductor 166. This potential is applied through cathode follower 167 to the primary winding 168 of a transformer 169, the secondary circuit of which includes secondary winding 171 and condenser 172 in series with four diodes 173, 174, 176, and 177 in series parallel. These diodes are so connected as to serve as a rectifier permitting the condenser 172 to charge to the secondary voltage. The condenser 172 is shunted by a high resistance 178 which permits the condenser charge to leak off very slowly. The conductor 179 joining diodes 173 and 177 is grounded for alternating current by a condenser 181, so that the conductor 182 is effectively at ground potential for alternating current. During a very small part of each cycle the diodes all become conductive and, in the absence of other applied voltages, the potentials of all of their electrodes and of conductors 182 and 183 are approximately equal. The condenser 181, however, does not conduct direct-current, so that the direct-current potential to ground is controlled by the direct current voltage applied through conductor 158. This instantaneous voltage at conductor 158 is determined by the direct-current bias level of cathode 184 of tube 147 as controlled by rheostat 186, and by the instantaneous magnitude of the alternating current output at cathode 184 and output conductor 148. If, however, malfunction should occur tending to drive the modulator grid 139 positive, the phase at conductor 158 would reverse and its alternating voltage magnitude increase, the polarity of feedback then being such as to reduce the positive feedback voltage applied to junction 137, rapidly reaching a level that restores the amplifier to normal functioning.

The output of the phase converter 118, Figure 3, is applied from its output conductor 148 to a quadrature circuit consisting of a resistor 188 and condenser 189 in series, the capacitive reactance being equal to the resistance at 999 14/15 C. P. S., the frequency applied thereto. The output of the target height generator is also applied to the quadrature circuit from slider 117 through conductor 191. The output of the quadrature circuit at its junction 192 is, therefore, a sinusoidal voltage having a frequency of 999 14/15 C. P. S., a phase relative to the antenna azimuth phase representing target elevation angle, and a magnitude equal to the quadrature sum of the applied voltage magnitudes, and therefore proportional to and the analogue of target slant range. This output potential at junction 192 is illustrated at M, Figure 4, for hypothetical values of elevation angle $\phi$ and slant range $R_s$.

The magnitude of this target slant range analogue voltage is employed to generate target slant range pulses, first being converted to a proportional direct voltage in a conventional rectifier 193.

In order to simulate the radar microwave pulse repetition frequency of 1170 pulses per second a trigger generator 194 of the conventional blocking oscillator type is employed. This oscillator is connected to trigger a conventional sawtooth generator 196 of the multivibrator type. The range pickoff circuit 197 is also conventional and may be, for example, of the type disclosed in Patent No. 2,555,440 dated June 5, 1951.

In operation, the range pickoff circuit 197 is energized by the sawtooth voltage derived from the generator 196 and by the direct-current range voltage derived from rectifier 193, with the result that a train of pulses is produced at the repetition frequency of 1170 P. P. S. having a phase, relative to that of the sawtooth phase, representing slant range. This pulse train is illustrated at N, Figure 4, the phasing representing the magnitude of the target slant range, the sawtooth of 1170 P. R. F. generated by circuit 196 being also shown.

The slant range signal as illustrated at M, Figure 4, is also transmitted from junction 192 to a target elevation pulse generator 198. In this circuit only the target elevation angle information is utilized. A limiting amplifier first eliminates the amplitude information and steepens the curve where it crosses the axis. A rectangular negative 1μs. pulse is derived at the time of each down-going axis crossing and is applied to the output conductor 199. This pulse is illustrated at O, Figure 4.

Figure 7:
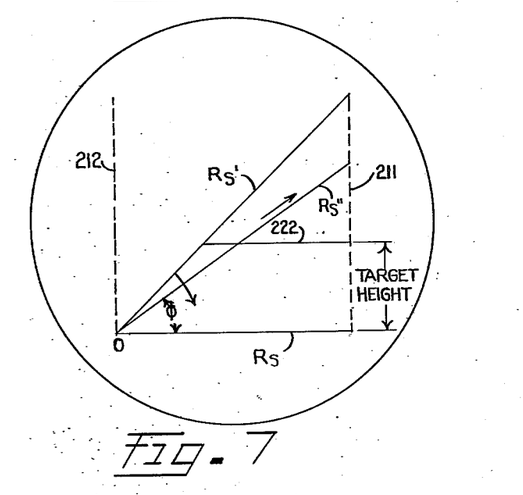
Figure 7 illustrates the display of the simulator of the invention.

The trigger generator 194 output pulse train is also applied to a horizontal scanning circuit 201 for the control of the horizontal scan of the raster of a cathode ray tube 202. The appearance of this raster is shown in Figure 7. In the absence of an elevation scan the horizontal scanning circuit 201 produces the raster line $R_s$, magnitudes along this horizontal line representing slant range. The cathode ray beam scans this line relatively slowly from left to right, with rapid dark return from right to left. In order to blank the tube to secure this dark return a connection is made from the trigger generator 194 through a blanking circuit 203 to the cathode ray tube 202.

The generation of an elevation sawtooth voltage form by circuit 31 having a frequency of 10 P. P. S. and the form shown at E, Figure 4, was described in connection with Figure 5, the sawtooth form being generated at the cathode 74 of the cathode follower 73. This sawtooth voltage form is also conducted from cathode 74 through conductor 204, Figures 3 and 5, to an elevation scanning circuit 206, Figure 3. This circuit 206 generates another sawtooth scanning form at the frequency of 1170 P. P. S., being triggered and synchronized by the trigger generator 194 through conductor 207. The peak magnitude of this latter sawtooth form is controlled by the magnitude, at any instant of occurrence of a pulse obtained from the generator 194, of the 10 P. P. S. sawtooth scan derived from the elevation antenna generator 31 through conductor 204. A conductor 208, Figures 3 and 5, conducts blanking pulses mechanically generated by cam contacts 209, Figure 5, to the blanking circuit 203, Figure 3.

In operation let it be assumed that the 10 P. P. S. sawtooth as illustrated at E, Figure 4, is at its peak value at the instant of occurrence of a pulse derived from generator 194. The maximum amplitude of the elevation scan sawtooth applied by circuit 206, Figure 3, to the elevation yoke coil of the cathode ray tube 202 then is effective and, being in synchronism and phase with the horizontal scan, produces the 45° line $R_s'$ on the raster, Figure 7. A short time later on the occurrence of others of the 1170 P. P. S. train, the 10 P. P. S. sawtooth voltage being lower, the elevation scan peak magnitude is lower and the raster line $R_s''$ is produced. Thus the scanning raster consists of a triangular area incorporated between the limits of the line $R_s$ and $R_s'$ and the area is scanned in a series of beam sweeps all beginning at the point 0, diverging with respect to each other and all ending at the vertical limit indicated by the dotted line 211, there being a total of 105 such beam sweeps or lines in any field. The horizontal distance from a vertical line 212 through 0 to any point on any slanting line indicates the slant range represented by that point, and the angle φ of any slanting line represents a function of target elevation. The vertical height of any point on any line above the horizontal line $R_s$ represents target elevation.

The cathode ray tube 202 illuminates the above-described raster only as permitted by two coincidence circuits connected in tandem. The first coincidence circuit 213, Figure 3, is partly controlled by the output pulses C, Figure 4, applied to it through conductor 101 from the antenna azimuth gate generator 27. This coincidence circuit is also partly controlled by the target azimuth pulses K, Figure 4, applied to it through conductor 214 from the target azimuth pulse generator 114. Since the latter's phase is constant relative to the reference phase, while that of the antenna signal changes continuously these signals come into coincidence but once in each 15 seconds. When that occurs, the output signal of the range pickoff circuit 197 on conductor 216 is for a short time permitted to pass through coincidence circuit 213 to the conductor 217, and the train of pulses shown at N, Figure 4, is applied to the second coincidence circuit 218.

This second coincidence circuit 218 is controlled by two input signals. One is the target elevation angle pulse train as shown at O, Figure 4, transmitted from the target elevation pulse generator 198 through conductor 199 to the coincidence circuit 218. The other controlling signal is secured through conductor 99 from the antenna elevation gate generator 33 and is shown at G, Figure 4. Both signals are synchronized relative to the 999 14/15 C. P. S. antenna azimuth signal. The target signal remains fixed in phase relative thereto except as the target moves in elevation angle, but the antenna elevation signal changes in phase through an amount representing the 11° antenna elevation motion, executing a complete cycle every 0.1 second. When, therefore, during each 0.1 second period these two pulse trains come into phase coincidence, the coincidence circuit 218 is made conductive and permits the range pulses N, Figure 4, to pass from conductor 217 through conductor 221 to the cathode ray tube 202, intensifying it and causing the formation of a luminous spot or pip on its screen. This spot may be at any point within the triangular area of the screen, Figure 7, included within the lines 211, $R_s$ and $R_s'$. Phosphor persistence causes the spot to remain during the periods between intensification. The distance of this spot above the base line $R_s$ represents the height of the simulated target above ground and therefore this distance constitutes the desired output data of the simulator.

Measurement of the distance of the luminous pip above the base line is conveniently made by a horizontal luminous line 222 that is movable under control of the operator. This line is generated by use of a pick-off circuit 223, Figure 3, controlled by a calibrated knob 224. The pick-off circuit generates a pulse every time that the sawtooth output of the elevation scan circuit 206 crosses, on its down-going slow stroke, the voltage level selected by the knob 224. This series of pulses causes the cathode ray tube 202 to intensify its beam at each pulse, resulting in a horizontal series of luminous pips between lines $R_s'$ and 211, Figure 7, appearing as a solid luminous line. The knob 224 is calibrated in feet of target height, so that when the operator, by rotating the knob, places the line 222 in coincidence with a target pip, he can read the target height directly from the scale on knob 224.

What is claimed is:

1. An elevation scanning radar simulator comprising, means for generating a pair of pulse signal trains the time of occurrence of individual pulses of which are respectively equivalent to the horizontal and elevational motion of an elevation scanning radar antenna beam, means for generating a plurality of pulse signal trains the time of occurrence of individual pulses of which are respectively equivalent to the azimuth, slant range and elevation of a simulated target, a cathode ray tube including an intensifying electrode and circuit means for impressing selected ones of said pulse signals on said intensifying electrode only during the time of simultaneous occurrence of pulse signals of said pulse signal trains.

2. An elevation scanning radar simulator comprising, means for generating an antenna azimuth pulse signal train the time of occurrence of individual pulses of which is equivalent to the horizontal motion of an elevation scanning radar antenna beam, means for generating an antenna elevation pulse signal train the time of occurrence of individual pulses of which is equivalent to the elevational motion of an elevation scanning radar antenna, means for generating a target azimuth pulse signal train the time of occurrence of individual pulses of which is equivalent to the azimuth of a simulated target, means for generating a slant range pulse signal train the time of occurrence of individual pulses of which is equivalent to the slant range of said simulated target, means for generating a target elevation pulse signal train the time of occurrence of individual pulses of which is equivalent to the elevation of said simulated target, a first coincidence circuit means including an output circuit inhibiting the transmission of pulse signals therethrough except at the times of simultaneous occurrence of pulses of said antenna azimuth train, said target azimuth train and said slant range signal train, a cathode ray tube including an intensifying electrode, a second coincidence circuit means interconnecting the output circuit of said first coincidence circuit means and said intensifying electrode and preventing the imposition of pulse signals on said intensifying electrode except at the times of simultaneous occurrence of pulses of said target elevation train and said antenna elevation train.

3. An elevation scanning radar simulator comprising, means for generating a first alternating potential having a phase which varies in proportion to the constantly changing azimuth angle of a simulated radar antenna beam, means for generating a second alternating potential having a magnitude proportional to ground range of a simulated target and a phase proportional to azimuth thereof, means for deriving a third alternating potential from said first potential having a magnitude proportional to the height of a simulated target, means for obtaining a vector sum potential from said second and third potentials representing slant range, means for generating pulses whose time of occurrence depends on said vector sum potential, a cathode ray tube having an intensifying electrode, means for generating an electrical signal representative of the elevation coincidence of said simulated beam and simulated target, and means for impressing said pulses on said intensifying electrode only during periods of phase coincidence of said first and second alternating potentials and of said electrical signal.

4. An elevation scanning radar simulator comprising, means for generating a first potential having a phase which varies in proportion to the constantly changing elevation angle of a simulated elevation scanning radar antenna beam, means for generating a second alternating potential having a magnitude proportional to slant range of a simulated target and phase proportional to the elevation thereof, a cathode ray tube having an intensifying electrode, means for generating an electrical signal representative of the azimuth coincidence of said simulated beam and said simulated target, means for generating a train of pulses having a phase representative of said slant range, and means for impressing said pulses on said intensifying electrode only during periods of phase coincidence of said first and second potentials and of said electrical signal.

5. An elevation scanning radar simulator comprising, means for producing a target direction potential having magnitude proportional to ground range of a simulated target and phase proportional to the azimuth thereof, means for producing an antenna azimuth potential having phase varying in proportion to the changing azimuth of a simulated antenna, means for deriving from said antenna azimuth potential a height potential of the same phase and having a magnitude proportional to the height of said simulated target, phase converting means for causing said target direction potential to have a phase equal to that of said antenna azimuth potential, means for quadrature addition of said phase converted target direction potential and said height potential to form a slant range potential having magnitude proportional to the slant range of said simulated target and phase proportional to the elevation thereof, generating means for producing a pulse train having a repetition frequency simulating that of radar pulses, means for controlling the phase of said simulated radar pulse train in accordance with the magnitude of said slant range potential, generating means for producing an antenna elevation potential having its magnitude varying in accordance with the elevation of said simulated antenna, means for producing from said antenna azimuth potential an antenna elevation pulse train having its phase changing in synchronism with the variation in magnitude of said antenna elevation potential, a first coincidence circuit controlled by coincidence in phase of said antenna azimuth potential and said target direction potential whereby it is made conductive for the passage of said simulated radar pulse train having a phase representing slant range, a second coincidence circuit controlled by coincidence in phase of said slant range potential and said antenna elevation pulse train whereby it is made conductive for the passage of said simulated radar pulse train having a phase representing slant range, a cathode ray tube having an intensifying electrode, and means connecting said second coincidence circuit and said intensifying electrode for the application thereto of said simulated radar pulse train having a phase representing slant range.

6. An elevation scanning radar simulator comprising, means for generating a target position signal whose magnitude is equivalent to the slant range of a simulated target and whose phase is equivalent to the elevation of said simulated target, means for generating a target azimuth signal whose phase is equivalent to the azimuth of said simulated target, means for generating an antenna azimuth signal whose phase varies in proportion to the horizontal rotation of a simulated radar antenna, means for generating from said target position signal a first train of pulse signals the instantaneous times of occurrence of which are proportional to the magnitude of said target position signal, a switching circuit having said train of pulses impressed thereon, said switch circuit including means for preventing transmission of pulses of said train therethrough except during those intervals during which said antenna azimuth signal and said target azimuth signal bear a selected phase relation to each other, means for generating a second train of pulse signals the instantaneous individual times of occurrence relative to each other of which are proportional to the vertical deflection of a simulated radar antenna, a cathode ray tube including an intensifying electrode and cathode ray deflecting means, means including said deflecting means for scanning said cathode ray over successive diverging paths from a common origin at the frequency of occurrence of said first train of pulse signals, a transmission circuit interconnecting said switching circuit and said intensifying electrode and means for inhibiting the transmission of pulse signals derived from said switch circuit through said transmission circuit except during those intervals during which signals of said second train of pulse signals bear a selected phase relation to said target position signal.

References Cited in the file of this patent
UNITED STATES PATENTS
2,240,420   Schnitzer _______________ Apr. 29, 1941

UNITED STATES PATENTS

| | | |
|---|---|---|
| 2,399,661 | Bowie | May 7, 1946 |
| 2,466,044 | Schoenfeld | Apr. 5, 1949 |
| 2,510,529 | Takats | June 6, 1950 |
| 2,555,442 | Hales | June 5, 1951 |
| 2,561,475 | Jacobsen | July 24, 1951 |
| 2,599,305 | Westwood | June 3, 1952 |
| 2,644,156 | Schneider | June 30, 1953 |
| 2,652,636 | Garman et al. | Sept. 22, 1953 |
| 2,677,199 | Droz | May 4, 1954 |
| 2,693,647 | Bolster et al. | Nov. 9, 1954 |